United States Patent
Kosaka et al.

(10) Patent No.: US 8,409,683 B2
(45) Date of Patent: Apr. 2, 2013

(54) PRESSURE-SENSITIVE ADHESIVE TAPE ROLL

(75) Inventors: Tokuhisa Kosaka, Ibaraki (JP); Shinji Inokuchi, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 228 days.

(21) Appl. No.: 12/588,792

(22) Filed: Oct. 28, 2009

(65) Prior Publication Data
US 2010/0119803 A1    May 13, 2010

(30) Foreign Application Priority Data

Nov. 13, 2008 (JP) ................... 2008-290593

(51) Int. Cl.
*B32B 9/00* (2006.01)
*B32B 7/12* (2006.01)

(52) U.S. Cl. ............... 428/40.1; 428/40.2; 428/304.4; 428/317.1; 428/317.5; 428/906

(58) Field of Classification Search ............... 428/40.1, 428/40.2, 317.1–317.5, 906
See application file for complete search history.

(56) References Cited

U.S. PATENT DOCUMENTS

| 2,372,400 | A | 3/1945 | Smith | |
|---|---|---|---|---|
| 2009/0258176 | A1* | 10/2009 | Muta et al. | 428/41.5 |

FOREIGN PATENT DOCUMENTS

| DE | 10160323 A1 | 6/2003 |
|---|---|---|
| EP | 1041131 A1 | 10/2000 |
| EP | 2039506 A1 | 3/2009 |
| EP | 2087995 A1 | 8/2009 |
| JP | 63-149942 U | 10/1988 |
| JP | 63-199147 U | 12/1988 |
| JP | 2003-327929 A | 11/2003 |
| JP | 2006-022189 A | 1/2006 |
| JP | 2008-012798 A | 1/2008 |
| WO | WO-2008/069128 A1 | 6/2008 |

OTHER PUBLICATIONS

European Search Report dated Feb. 10, 2010, issued on the European Patent Application No. 09174159.5.

* cited by examiner

*Primary Examiner* — Patricia Nordmeyer
(74) *Attorney, Agent, or Firm* — Edwards Wildman Palmer LLP

(57) ABSTRACT

A pressure-sensitive adhesive tape roll includes a bobbin and, helically wound therearound, a double-sided pressure-sensitive adhesive tape. The tape includes a double-sided pressure-sensitive adhesive body including a pressure-sensitive adhesive layer containing bubbles and/or hollow microspheres, and arranged on both sides thereof, a release liner A wider than the adhesive body, and an olefinic release liner B. In portions occupying 70% or more of the total length of the tape, a crosswise extending-off portion of the release liner A of an (n)th-turn portion of the adhesive tape vertically overlaps the adhesive body of an adjacent (n+1)th-turn portion of the adhesive tape to form an overlapping portion; the width of the overlapping portion is one half or more of the width of the adhesive body; and the adhesive body of the (n)th-turn adhesive tape is not present below the adhesive body of the adjacent (n+1)th-turn adhesive tape.

20 Claims, 3 Drawing Sheets

PRESSURE-SENSITIVE ADHESIVE TAPE ROLL

BACKGROUND OF THE INVENTION

1. Field of the Invention

The present invention relates to pressure-sensitive adhesive tape rolls. Specifically, it relates to pressure-sensitive adhesive tape rolls which include a bobbin (core) and a double-sided pressure-sensitive adhesive tape helically wound around the bobbin, which double-sided pressure-sensitive adhesive tape includes a pressure-sensitive adhesive layer containing bubbles and/or hollow microspheres.

2. Description of the Related Art

Pressure-sensitive adhesive tapes including a thick pressure-sensitive adhesive layer, such as bubble-containing pressure-sensitive adhesive tapes, are used as pressure-sensitive adhesive tapes to be affixed to adherends having curved surface and/or uneven surface. Pressure-sensitive adhesive tapes are often commercially distributed as pressure-sensitive adhesive tape rolls which include a core and, wound therearound, a pressure-sensitive adhesive body bearing (temporarily being affixed to) a release liner (separator) on one or both sides thereof. Known procedures for winding such a pressure-sensitive adhesive tape around a core include "record winding" (disk winding) in which the pressure-sensitive adhesive tape is concentrically wound around the core at the same position to form a disk-like roll; and bobbin winding (cylindrical winding) in which the pressure-sensitive adhesive tape is traversed in a cross direction (width direction) and helically wound around the core (bobbin). Bubble-containing pressure-sensitive adhesive tapes and other pressure-sensitive adhesive tapes having a thick pressure-sensitive adhesive layer often employ bobbin winding, because if they are wound through disk winding, only short lengths (small meters) of them can be wound.

Such helically wound pressure-sensitive adhesive tape rolls, however, often suffer from blocking of the pressure-sensitive adhesive tape, because pressure caused typically by tape winding tension renders the pressure-sensitive adhesive layer to extend off the edge of the release liner to thereby cause blocking. As a possible solution to solve the blocking problem, there has been proposed a technique in which a release liner having a width larger than that of the body of a pressure-sensitive adhesive tape (pressure-sensitive adhesive body) so as to prevent blocking between lateral sides (side surfaces) of pressure-sensitive adhesive layers of adjacent portions of the pressure-sensitive adhesive tape.

Common release liners used for pressure-sensitive adhesive tape rolls include those having a substrate (carrier) and, arranged on a surface thereof, a releasably treated layer; and films made typically from a fluorine-containing polymer or non-polar polymer. A helically wound (bobbin-wound) pressure-sensitive adhesive tape roll, if employing such a common release liner, suffers from problems as follows. Specifically, the release liner may be accidentally or unintentionally peeled off due to its too good releasability typically during tape winding. In particular, when the release liner has a width larger than the width of the pressure-sensitive adhesive body so as to prevent the blocking typically in lateral sides of the pressure-sensitive adhesive layer, it often fails to give a pressure-sensitive adhesive tape roll which is tightly and systematically wound and has a good appearance. This is because, when the pressure-sensitive adhesive tape is wound, the release face of a portion of the release liner extending off the pressure-sensitive adhesive body (crosswise extending-off portion) comes in contact with the backside of the release liner of an adjacent turn of the pressure-sensitive adhesive tape, and this may cause collapse of the end regions during winding, cause dislocation (weaving) of the wound tape in a cross direction (width direction), or allow the air to enter in between adjacent portions of the pressure-sensitive adhesive tape. Additionally, the roll may become loose and wound down during unwinding of the pressure-sensitive adhesive tape.

To prevent weaving in a cross direction (looseness in winding) and other problems of such wound tapes, there is known a technique of using a release liner having a slightly tacky release face (see Japanese Unexamined Patent Application Publication (JP-A) No. 2008-12798). However, even this technique suffers from looseness in winding when adjacent portions of the pressure-sensitive adhesive tape overlap each other in a small width.

SUMMARY OF THE INVENTION

Accordingly, an object of the present invention is to provide a pressure-sensitive adhesive tape roll which is free from looseness in winding (weaving) during winding, storage, and unwinding of the roll.

After intensive investigations to achieve the object, the present inventors have found that a pressure-sensitive adhesive tape roll being free from looseness in winding of a pressure-sensitive adhesive tape can be obtained by bobbin-winding (helically winding) a pressure-sensitive adhesive tape using a specific release liner around a bobbin so that an extending-off portion of the release liner extending off a pressure-sensitive adhesive body vertically overlaps the pressure-sensitive adhesive body of an adjacent portion of the pressure-sensitive adhesive tape, and the resulting overlapping portion has a width half or more of the width of the pressure-sensitive adhesive body of the adjacent portion of the pressure-sensitive adhesive tape. The present invention has been made based on these findings.

Specifically, according to an embodiment of the present invention, there is provided a pressure-sensitive adhesive tape roll which includes a bobbin and a double-sided pressure-sensitive adhesive tape helically wound around the bobbin, in which the double-sided pressure-sensitive adhesive tape satisfies all the following conditions (1) to (5): (1) the double-sided pressure-sensitive adhesive tape includes a pressure-sensitive adhesive body having two adhesive faces as both sides thereof, a release liner A arranged on one of the two adhesive faces, and a release liner B arranged on the other adhesive face; (2) the pressure-sensitive adhesive body includes at least a pressure-sensitive adhesive layer containing bubbles and/or hollow microspheres; (3) the release liner A essentially contains at least one resin selected from the group consisting of low-density polyethylenes, linear low-density polyethylenes, and ethylene-vinyl acetate resins; (4) the release liner B essentially contains at least one olefinic resin; and (5) the release liner A has a width larger than the width of the pressure-sensitive adhesive body, and all the following conditions (a), (b), and (c) are satisfied in portions occupying 70% or more of the total length of the pressure-sensitive adhesive tape: (a) at least part of a crosswise extending-off portion of the release liner A of an (n)th-turn portion of the pressure-sensitive adhesive tape vertically overlaps the pressure-sensitive adhesive body of an adjacent (n+1)th-turn portion of the pressure-sensitive adhesive tape to form an overlapping portion; (b) the width of the overlapping portion is one half or more of the width of the pressure-sensitive adhesive body; and (c) the pressure-sensitive adhesive body of the (n)th-turn portion of the pressure-sensitive adhesive tape does not vertically overlap the pressure-sensitive adhesive body of the adjacent (n+1)th-turn portion of the pressure-sensitive adhesive tape.

The pressure-sensitive adhesive body preferably has a width of from 2 to 30 mm.

The pressure-sensitive adhesive body preferably has a thickness of from 1 µm to 5 mm. The release liner A may have a thickness of from 10 to 300 µm. The release liner B may have a thickness of from 3 to 500 µm. The double-sided pressure-sensitive adhesive tape preferably has a total length of from 200 to 1500 m. The pressure-sensitive adhesive layer may be made mainly from an acrylic pressure-sensitive adhesive.

According to the present invention, a pressure-sensitive adhesive tape is helically wound around a bobbin so that an extending-off portion of the release liner extending off the pressure-sensitive adhesive body in a pressure-sensitive adhesive tape at a certain turn overlaps the pressure-sensitive adhesive body of an adjacent portion of the pressure-sensitive adhesive tape in a next turn in a width of one half or more of the width of the pressure-sensitive adhesive body. The resulting pressure-sensitive adhesive tape is resistant to widthwise (crosswise) dislocation of the pressure-sensitive adhesive tape, is free from collapse of end regions during winding, is free from looseness in winding during storage of the roll and during unwinding of the pressure-sensitive adhesive tape, and is thereby advantageous.

These and other objects, features, and advantages of the present invention will be more fully understood from the following description of preferred embodiments with reference to the attached drawings. All numbers are herein assumed to be modified by the term "about."

DESCRIPTION OF THE PREFERRED EMBODIMENTS

Figure 1:
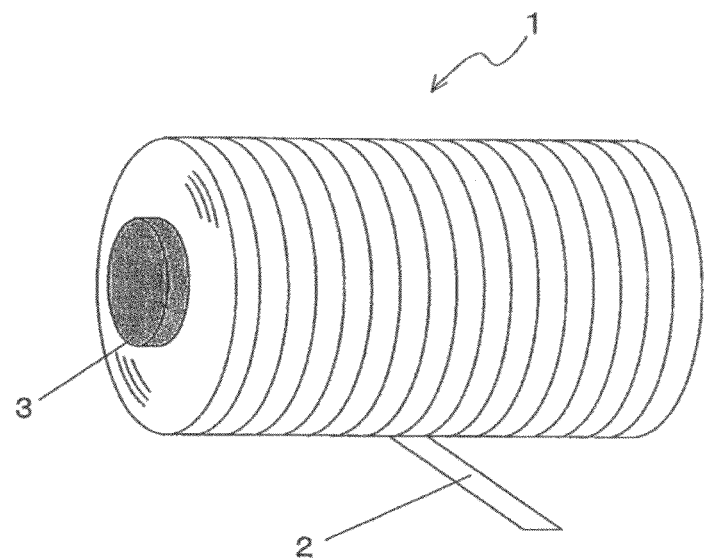
FIG. 1 is a schematic diagram showing a pressure-sensitive adhesive tape roll according to an embodiment of the present invention.

Pressure-sensitive adhesive tape rolls according to embodiments of the present invention are pressure-sensitive adhesive tape rolls each including a bobbin and a double-sided pressure-sensitive adhesive tape helically wound around the bobbin.

Double-Sided Pressure-Sensitive Adhesive Tape

A double-sided pressure-sensitive adhesive tape (hereinafter also simply referred to as "pressure-sensitive adhesive tape") for use herein structurally includes a pressure-sensitive adhesive body having adhesive faces as both sides thereof (double-sided pressure-sensitive adhesive body); a release liner A arranged on one of the two adhesive faces; and a release liner B on the other adhesive face. As used herein a "double-sided pressure-sensitive adhesive tape" basically refers to one including "release liners"; and a "residual part of the double-sided pressure-sensitive adhesive tape from which release liners are eliminated" is also referred to as a "pressure-sensitive adhesive body". A surface of a pressure-sensitive adhesive layer (self-adhesive layer) of the pressure-sensitive adhesive body is also referred to as an "adhesive face".

Pressure-Sensitive Adhesive Body

The pressure-sensitive adhesive body includes at least one pressure-sensitive adhesive layer containing bubbles and/or hollow microspheres. Such a pressure-sensitive adhesive layer containing bubbles and/or hollow microspheres is hereinafter also generically referred to as a "bubble-containing pressure-sensitive adhesive layer". The pressure-sensitive adhesive body is not critical in its configuration or structure, as long as having adhesive faces as both sides and having at least one bubble-containing pressure-sensitive adhesive layer. Exemplary possible pressure-sensitive adhesive bodies for use herein include "substrate-less (transfer) pressure-sensitive adhesive bodies" such as one containing a bubble-containing pressure-sensitive adhesive layer alone or one having no substrate but containing a bubble-containing pressure-sensitive adhesive layer and another pressure-sensitive adhesive layer containing no bubbles; "substrate-supported pressure-sensitive adhesive bodies" such as one including a substrate (base layer), a bubble-containing pressure-sensitive adhesive layer arranged on at least one side of the substrate, and another bubble-containing pressure-sensitive adhesive layer or a pressure-sensitive adhesive layer of another type arranged on the other side of the substrate.

Bubble-Containing Pressure-Sensitive Adhesive Layer

The bubble-containing pressure-sensitive adhesive layer in the pressure-sensitive adhesive body is a pressure-sensitive adhesive layer containing bubbles (gas bubbles) and/or hollow microspheres. The pressure-sensitive adhesive layer is made mainly from a known or common pressure-sensitive adhesive (self-adhesive agent). The content of the pressure-sensitive adhesive is preferably 40 percent by weight or more, and more preferably from 50 to 100 percent by weight, based on the total weight of the bubble-containing pressure-sensitive adhesive layer. Examples of the pressure-sensitive adhesive include, but not limited to, acrylic pressure-sensitive adhesives, rubber pressure-sensitive adhesives, vinyl alkyl ether pressure-sensitive adhesives, silicone pressure-sensitive adhesives, polyester pressure-sensitive adhesives, polyamide pressure-sensitive adhesives, urethane pressure-sensitive adhesives, fluorine-containing pressure-sensitive adhesives, epoxy pressure-sensitive adhesives, and other known pressure-sensitive adhesives. Among them, acrylic pressure-sensitive adhesives are preferably used as the pressure-sensitive adhesive. Each of different pressure-sensitive adhesives can be used alone or in combination. The pressure-sensitive adhesives can be in any form. For example, they can be emulsion pressure-sensitive adhesives, solvent pressure-sensitive adhesives, hot-melt pressure-sensitive adhesives, and pressure-sensitive adhesives that are curable by the action of active energy rays, such as ultraviolet-curable pressure-sensitive adhesives.

Though not especially limited, the acrylic pressure-sensitive adhesives are pressure-sensitive adhesives containing an acrylic polymer as a base polymer (main component). Preferred main monomer components constituting the acrylic polymer include alkyl esters of (meth)acrylic acids, each having a linear or branched-chain alkyl group (hereinafter also simply referred to as "alkyl (meth)acrylates"). Exemplary alkyl (meth)acrylates include alkyl (meth)acrylates whose alkyl moiety having 1 to 20 carbon atoms, such as methyl (meth)acrylates, ethyl (meth)acrylates, propyl (meth)acrylates, isopropyl (meth)acrylates, butyl (meth)acrylates, isobutyl (meth)acrylates, s-butyl (meth)acrylates, t-butyl (meth)acrylates, pentyl (meth)acrylates, isopentyl (meth)acrylates, hexyl (meth)acrylates, heptyl (meth)acrylates, octyl (meth)acrylates, 2-ethylhexyl (meth)acrylates, isooctyl (meth)acrylates, nonyl (meth)acrylates, isononyl (meth)acrylates, decyl (meth)acrylates, isodecyl (meth)acrylates, undecyl (meth)acrylates, dodecyl (meth)acrylates, tridecyl (meth)acrylates, tetradecyl (meth)acrylates, pentadecyl (meth)acrylates, hexadecyl (meth)acrylates, heptadecyl (meth)acrylates, octadecyl (meth)acrylates, nonadecyl (meth)acrylates, and eicosyl (meth)acrylates. Among them, alkyl (meth)acrylates whose alkyl moiety having 2 to 14 carbon atoms are preferred, and alkyl (meth)acrylates whose alkyl moiety having 2 to 10 carbon atoms are more preferred, of which 2-ethylhexyl acrylate is especially preferred. As used herein the term "(meth)acrylic" means "acrylic" and/or "methacrylic", and other terms are alike.

Each of different alkyl (meth)acrylates can be used alone or in combination. Alkyl (meth)acrylates are used as a major monomer component (main monomer component) of the acrylic polymer, and the proportion of alkyl (meth)acrylates is preferably 60 percent by weight or more (for example, from 60 to 99 percent by weight), and more preferably 80 percent by weight or more, based on the total amount of monomer components constituting the acrylic polymer.

The acrylic polymer may further contain one or more copolymerizable monomers such as polar-group-containing monomers and multifunctional monomers, as monomer components. Such copolymerizable monomers, if used as a monomer component, may typically help to improve bond strength of the pressure-sensitive adhesive to adherends and to increase the cohesive strength of the pressure-sensitive adhesive. Each of different copolymerizable monomers can be used alone or in combination.

Exemplary polar-group-containing monomers include carboxyl-containing monomers such as (meth)acrylic acids, itaconic acid, maleic acid, fumaric acid, crotonic acid, and isocrotonic acid, and anhydrides of them, such as maleic anhydride; hydroxyl-containing monomers including hydroxyalkyl (meth)acrylates such as hydroxyethyl (meth)acrylates, hydroxypropyl (meth)acrylates, and hydroxybutyl (meth)acrylates, as well as vinyl alcohol and allyl alcohol; amido-containing monomers such as (meth)acrylamides, N,N-dimethyl(meth)acrylamides, N-methylol(meth)acrylamides, N-methoxymethyl(meth)acrylamides, and N-butoxymethyl(meth)acrylamides; amino-containing monomers such as aminoethyl (meth)acrylates, dimethylaminoethyl (meth)acrylates, and t-butylaminoethyl (meth)acrylates; glycidyl-containing monomers such as glycidyl (meth)acrylates and methylglycidyl (meth)acrylates; cyano-containing monomers such as acrylonitrile and methacrylonitrile; heterocycle-containing vinyl monomers such as N-vinyl-2-pyrrolidone and (meth)acryloylmorpholines, as well as N-vinylpyridine, N-vinylpiperidone, N-vinylpyrimidine, N-vinylpiperazine, N-vinylpyrrole, N-vinylimidazole, and N-vinyloxazole; alkoxyalkyl (meth)acrylate monomers such as methoxyethyl (meth)acrylates and ethoxyethyl (meth)acrylates; sulfonate-containing monomers such as sodium vinylsulfonate; phosphate-containing monomers such as 2-hydroxyethylacryloyl phosphate; imido-containing monomers such as cyclohexylmaleimide and isopropylmaleimide; and isocyanate-containing monomers such as 2-methacryloyloxyethyl isocyanate. Of polar-group-containing monomers, carboxyl-containing monomers and anhydrides of them are preferred, of which acrylic acid is more preferred.

The amount (monomer proportion) of polar-group-containing monomers is 30 percent by weight or less (for example from 1 to 30 percent by weight), and preferably from 3 to 20 percent by weight, based on the total amount of monomer components for constituting the acrylic polymer. Polar-group-containing monomers, if present in an excessively large amount of more than 30 percent by weight, may typically cause excessively high cohesive strength of the acrylic pressure-sensitive adhesive to invite insufficient tackiness of the pressure-sensitive adhesive layer. Polar-group-containing monomers, if present in an excessively small amount (for example, less than 1 percent by weight), may not exhibit sufficient advantages due to their copolymerization.

Examples of the multifunctional monomers include hexanediol di(meth)acrylates, butanediol di(meth)acrylates, (poly)ethylene glycol di(meth)acrylates, (poly)propylene glycol di(meth)acrylates, neopentyl glycol di(meth)acrylates, pentaerythritol di(meth)acrylates, pentaerythritol tri(meth)acrylates, dipentaerythritol hexa(meth)acrylates, trimethylolpropane tri(meth)acrylates, tetramethylolmethane tri(meth)acrylates, allyl (meth)acrylates, vinyl (meth)acrylates, divinylbenzene, epoxy acrylates, polyester acrylates, and urethane acrylates.

The amount (monomer proportion) of multifunctional monomers is 2 percent by weight or less (for example, from 0 to 2 percent by weight), and more preferably from 0 to 1 percent by weight, based on the total amount of monomer components for constituting the acrylic polymer. Multifunctional monomers, if present in an amount of more than 2 percent by weight of the total amount of monomer components for constituting the acrylic polymer, may typically cause excessively high cohesive strength of the pressure-sensitive adhesive to invite insufficient tackiness of the pressure-sensitive adhesive layer.

Exemplary copolymerizable monomers other than the polar-group-containing monomers and multifunctional monomers include (meth)acrylic esters other than the alkyl (meth)acrylates, including (meth)acrylic esters having an alicyclic hydrocarbon group, such as cyclopentyl (meth)acrylates, cyclohexyl (meth)acrylates, and isobornyl (meth)acrylates, and (meth)acrylic esters having an aromatic hydrocarbon group, such as phenyl (meth)acrylates; vinyl esters such as vinyl acetate and vinyl propionate; aromatic vinyl compounds such as styrene and vinyltoluene; olefins or dienes such as ethylene, butadiene, isoprene, and isobutylene; vinyl ethers such as vinyl alkyl ethers; and vinyl chloride.

The acrylic polymer as a base polymer can be prepared using a curing reaction by the action of heat or active energy rays using a polymerization initiator such as thermal polymerization initiator or photoinitiator (photo-polymerization initiator). Typically, a bubble-containing pressure-sensitive adhesive layer structurally stably containing bubbles can be easily formed by curing a pressure-sensitive adhesive composition containing bubbles by the action of heat or active energy rays. The polymerization initiator used herein can be any of known or common polymerization initiators, such as those described in Japanese Unexamined Patent Application Publication (JP-A) No. 2008-12798, JP-A No. 2006-022189, and JP-A No. 2005-179561. Among such polymerization initiators, photoinitiators are preferably employed, typically because such a photo-induced polymerization can be carried out in a shorter time. Each of different polymerization initiators can be used alone or in combination.

Examples of the photoinitiators include, but are not limited to, benzoin ether photoinitiators, acetophenone photoinitiators, α-ketol photoinitiators, aromatic sulfonyl chloride photoinitiators, photo-activatable oxime photoinitiators, benzoin photoinitiators, benzyl photoinitiators, benzophenone photoinitiators, ketal photoinitiators, and thioxanthone photoinitiators. Though not critical, the amount of photoinitiators is, for example, preferably from 0.01 to 5 parts by weight, and more preferably 0.05 to 3 parts by weight, per 100 parts by weight of the total monomer components for constituting the acrylic polymer.

Exemplary active energy rays to be applied for the activation of photoinitiators include ionizing radiations such as alpha rays, beta rays, gamma rays, neutron beams, and electron beams; and ultraviolet rays. Among them, ultraviolet rays are preferably employed. The irradiation energy, irradiation duration, irradiation procedure, and other conditions for the application of active energy rays are not especially limited, as long as the photoinitiators are activated to cause a reaction of monomer components.

Examples of the thermal polymerization initiators include azo polymerization initiators, peroxide polymerization initiators, and redox polymerization initiators. The amount of thermal polymerization initiators is not especially limited, as long as they function as thermal polymerization initiators.

The bubble-containing pressure-sensitive adhesive layer in the pressure-sensitive adhesive body contains bubbles and/or hollow microspheres. The presence of bubbles and/or hollow microspheres helps the pressure-sensitive adhesive layer to follow uneven surfaces more satisfactorily. Examples of such pressure-sensitive adhesive layers containing bubbles and/or hollow microspheres usable herein can be found as the bubble-containing pressure-sensitive adhesive layers (bubble-containing self-adhesive layers) in JP-A No. 2008-12798, JP-A No. 2006-022189, and JP-A No. 2005-179561.

The bubbles are basically preferably closed cells, but they may be a mixture of closed cells and open cells. Such bubbles or cells generally have spherical shapes, but they may have deformed or irregular spherical shapes. Though not critical, the average cell size (diameter) of bubbles can be selected within ranges of typically from 1 to 1000 μm, preferably from 10 to 500 μm, and more preferably from 30 to 300 μm.

A gaseous component contained in the bubbles (gaseous component constituting bubbles; hereinafter also referred to as "bubble-constituting gas") is not especially limited and can be any gaseous component including inert gas such as nitrogen, carbon dioxide, or argon; or air. When a reaction such as polymerization reaction is conducted after the incorporation of a bubble-constituting gas, it is important that the bubble-constituting gas should be one not adversely affecting the reaction. Of such bubble-constituting gases, nitrogen gas is preferred, because it does not adversely affect reactions and is available inexpensively.

The amount of bubbles to be contained in the bubble-containing pressure-sensitive adhesive layer is not especially limited and can be set within a range not adversely affecting properties such as adhesive properties. From the viewpoint of adhesive properties, the amount of bubbles in terms of its lower limit is preferably 10 percent by volume or more, more preferably 11 percent by volume or more, and furthermore preferably 12 percent by volume or more; and from the viewpoint of cohesive strength, the amount of bubbles in terms of its upper limit is preferably 50 percent by volume or less, more preferably 40 percent by volume or less, and furthermore preferably 30 percent by volume or less, each based on the total volume of the bubble-containing pressure-sensitive adhesive layer.

The hollow microspheres may be either hollow inorganic microspheres or hollow organic microspheres. Exemplary hollow inorganic microspheres include hollow balloons made of glass, such as hollow glass balloons; hollow balloons made of metallic compounds, such as hollow alumina balloons; and hollow balloons made of ceramics, such as hollow ceramic balloons. Exemplary hollow organic microspheres include hollow balloons made from resins, such as hollow acrylic balloons and hollow poly(vinylidene chloride) balloons. Among them, hollow glass balloons are preferred.

Though not critical, the particle diameter (average particle diameter) of the hollow microspheres can be selected within ranges of typically from 1 to 500 μm, preferably from 5 to 200 μm, and more preferably from 10 to 100 μm.

Though not critical, the specific gravity of the hollow microspheres can be selected within ranges of typically from 0.1 to 0.8 g/cm$^3$, and preferably from 0.12 to 0.5 g/cm$^3$. Hollow microspheres, if having a specific gravity of less than 0.1 g/cm$^3$, are difficult to disperse in the pressure-sensitive adhesive composition uniformly, because such light-weight hollow microspheres may tend to float upon the composition during mixing. In contrast, hollow microspheres, if having a specific gravity of more than 0.8 g/cm$^3$, may be expensive to increase the production cost.

Though not critical, the amount of hollow microspheres can be selected within such ranges that hollow microspheres occupy, for example, 5 to 50 percent by volume, preferably 10 to 50 percent by volume, and more preferably 15 to 40 percent by volume, of the total volume of the bubble-containing pressure-sensitive adhesive layer. Hollow microspheres, if occupying less than 5 percent by volume, may not sufficiently exhibit their advantages. In contrast, hollow microspheres, if occupying more than 50 percent by volume, may cause the bubble-containing pressure-sensitive adhesive layer to have insufficient bond strength.

The bubble-containing pressure-sensitive adhesive layer preferably further contains one or more surfactants. The presence of such surfactants helps to reduce the adhesion and frictional drag between the hollow microspheres and the base polymer and helps the bubbles to be contained satisfactorily and stably. Exemplary surfactants usable herein include fluorine-containing surfactants, silicone surfactants, nonionic surfactants, and ionic surfactants. Among them, fluorine-containing surfactants are preferred, because they satisfactorily help the bubbles to be mixed and inhibit the coalescence of bubbles. Of fluorine-containing surfactants, fluorine-containing surfactants each having one or more oxy($C_2$-$C_3$) alkylene groups and one or more fluorinated hydrocarbon groups per molecule are more preferred. Among them, fluorine-containing nonionic surfactants are furthermore preferred, because they can satisfactorily disperse in the base polymer. Each of different fluorine-containing surfactants may be used alone or in combination. Of the fluorine-containing surfactants, those described in JP-A No. 2008-12798 and JP-A No. 2006-022189 are preferably employed.

The fluorine-containing surfactants can be also commercially available as products. Exemplary preferred commercial products include products supplied under the trade names "FTERGENT 251" and "FTX-218" by NEOS Co., Ltd.;

products supplied under the trade names "Megafac F-477" and "Megafac F-470" by DIC Corporation; products supplied under the trade names "Surflon S-381, S-383, S-393, KH-20, and KH-40" by AGC Seimi Chemical Co., Ltd.; products supplied under the trade names "EFTOP EF-352 and EF-801" by JEMCO Inc.; and a product supplied under the trade name "Unidyne TG-656" by Daikin Industries, Ltd.

The bubble-containing pressure-sensitive adhesive layer may further contain suitable additives according to the intended use. Exemplary additives include crosslinking agents corresponding to the type of the pressure-sensitive adhesives, such as polyisocyanate crosslinking agents, silicone crosslinking agents, epoxy crosslinking agents, and alkyl-etherified melamine crosslinking agents; tackifiers including tackifiers that are solid, semisolid, or liquid at ambient temperature (room temperature) and are made from materials such as rosin derivative resins, polyterpene resins, petroleum resins, and oil-soluble phenolic resins; plasticizers; fillers; age inhibitors; antioxidants; and colorants including dyestuffs and pigments such as carbon blacks.

Though not critical, the thickness of the bubble-containing pressure-sensitive adhesive layer is preferably from 1 μm to 5 mm, more preferably from 100 μm to 4 mm, and furthermore preferably from 200 μm to 3 mm. The bubble-containing pressure-sensitive adhesive layer may have either a single-layer structure or multilayer structure.

A composition for constituting the bubble-containing pressure-sensitive adhesive layer (pressure-sensitive adhesive composition) can be prepared by mixing, according to a known procedure, components such as monomer components (e.g., main monomer components and copolymerizable monomers) constituting the base polymer, a polymerization initiator, and additives. Where necessary typically for the modification of viscosity, the monomer components may be partially polymerized. Specifically, the pressure-sensitive adhesive composition may be prepared, for example, according to the following process including the steps (i) to (iv). (i) Monomer components for constituting the base polymer are mixed with a polymerization initiator to give a monomer mixture, and (ii) a polymerization reaction corresponding to the type of the polymerization initiator (for example, polymerization through ultraviolet irradiation) is carried out on the monomer mixture to give a composition (syrup) in which only part of the monomer components are polymerized. Next, (iii) the syrup is combined with hollow microspheres, if added, as well as surfactants and other additives according to necessity. Further, (iv) bubbles, if incorporated, are incorporated into the composition obtained in the step (iii). The way to prepare the pressure-sensitive adhesive composition is, however, not limited to this process. As used herein the term "syrup" refers to a "syrup-like composition".

Bubbles are preferably incorporated as a last component into the pressure-sensitive adhesive composition as in the above preparation process, so as to help the composition to mix with satisfactorily and to stably contain the bubbles. A composition before incorporation of bubbles preferably has a relatively high viscosity so as to contain bubbles stably. Hereinafter such a composition before incorporation of bubbles is also referred to as a "precursor composition" and examples thereof include a precursor composition obtained from the step (iii). Though not critical, the viscosity of the precursor composition is typically preferably from 5 to 50 Pa·s, and more preferably from 10 to 40 Pa·s, as measured with a BH type viscometer using a No. 5 rotor at a number of revolutions of 10 rpm and at a temperature of 30° C. A precursor composition, if having an excessively low viscosity of less than 5 Pa·s, may not satisfactorily bear bubbles, because incorporated bubbles can immediately coalesce to escape out of the system. In contrast, a precursor composition, if having an excessively high viscosity of more than 50 Pa·s, may be difficult to form a bubble-containing pressure-sensitive adhesive layer through coating. The viscosity of the precursor composition can be adjusted typically by incorporating polymer components such as acrylic rubbers and thickening additives thereinto; or by partially polymerizing monomer components for constituting the base polymer.

The way to incorporate bubbles into the precursor composition is not especially limited, and a known technique for mixing or blending bubbles into such compositions can be employed. An exemplary device for use herein is one that includes a stator and a rotor facing the stator. The stator has a disc having a through hole at the center part and having a multiplicity of fine teeth arranged on it. The rotor has a disc having a multiplicity of fine teeth arranged on it. Using this device, the precursor composition is introduced in between the teeth of the stator and the teeth of the rotor, and a gaseous component for constituting bubbles (bubble-constituting gas) is introduced via the through hole into the precursor composition while rotating the rotor at high speed, to allow the bubble-constituting gas to be finely divided and disperse in the precursor composition, to give a pressure-sensitive adhesive composition containing finely dispersed bubbles.

To suppress or prevent coalescence of bubbles, it is desirable to carry out the steps from the incorporation of bubbles to the formation of the bubble-containing pressure-sensitive adhesive layer successively as a series of steps. Specifically, it is desirable that a pressure-sensitive adhesive composition is prepared by mixing bubbles into a precursor composition in the above way, and the prepared pressure-sensitive adhesive composition is immediately subjected to the formation of the pressure-sensitive adhesive layer.

The way to form the bubble-containing pressure-sensitive adhesive layer is not particularly limited. Typically, it may be formed by applying the pressure-sensitive adhesive composition to a suitable carrier such as release liner or substrate to form a pressure-sensitive adhesive composition layer, and curing (e.g., thermal curing or curing through the application of an active energy ray) and/or drying the layer according to necessity. Among such procedures, curing through the application of an active energy ray is preferably employed.

Substrate

When the pressure-sensitive adhesive body has a substrate (base layer), exemplary substrates usable herein include suitable thin articles including paper substrates such as papers; fibrous substrates such as fabrics (cloths), nonwoven fabrics, and nets; metallic substrates such as metallic foils and metallic sheets or plates; plastic substrates such as plastic films and sheets; rubber substrates such as rubber sheets; foams such as foamed (cellular) sheets; and laminates of these. Of the laminates, a laminate of a plastic substrate with another substrate; and a laminate of one or more plies of plastic films or sheets are preferred. Exemplary materials for such plastic films or sheets include olefinic resins each containing an α-olefin as a monomer component, such as polyethylenes (PEs), polypropylenes (PPs), ethylene-propylene copolymers, and ethylene-vinyl acetate copolymers (EVAs); polyester resins such as poly(ethylene terephthalate)s (PETs), poly(ethylene naphthalate)s (PENs), and poly(butylene terephthalate)s (PBTs); poly(vinyl chloride)s (PVCs); vinyl acetate resins; poly(phenylene sulfide)s (PPSs); amide resins such as polyamides (nylons) and wholly aromatic polyamides (aramids); polyimide resins; and poly(ether ether ketone)s (PEEKs). Each of different materials can be used alone or in combination.

The thickness of the substrate can be suitably set according typically to the strength, flexibility, and intended use without limitation, but is generally 1000 μm or less (for example from about 1 to 1000 μm), preferably from about 1 to 500 μm, and more preferably from about 3 to 300 μm. The substrate may have a single-layer structure or multilayer structure. For increasing adhesion typically to the bubble-containing pressure-sensitive adhesive layer, the substrate may have been subjected to a common surface treatment such as corona treatment, chromate treatment, exposure to ozone, exposure to flame, exposure to high-voltage electric shock, treatment with ionizing radiation, and other oxidization treatments by a chemical or physical procedure. In addition or alternatively, the surface may have been coated typically with a primer or a release agent.

Other Pressure-Sensitive Adhesive Layers

The pressure-sensitive adhesive body may further include one or more other pressure-sensitive adhesive layers (hereinafter also referred to as "additional pressure-sensitive adhesive layer(s)") other than the bubble-containing pressure-sensitive adhesive layer. Exemplary additional pressure-sensitive adhesive layers include pressure-sensitive adhesive layers which contain neither bubbles nor hollow microspheres and are made from any of the pressure-sensitive adhesives exemplified in the description of the bubble-containing pressure-sensitive adhesive layer.

The thickness of the pressure-sensitive adhesive body is preferably from 1 μm to 5 mm, and more preferably from 100 μm to 4 mm. A pressure-sensitive adhesive body, if having a thickness of less than 1 μm, may not be so effective for use in bobbin winding as in the present invention. A pressure-sensitive adhesive body, if having a thickness of more than 5 mm, may impede bobbin winding of the resulting pressure-sensitive adhesive tape.

Release Liner A

The release liner A in the double-sided pressure-sensitive adhesive tape is a release liner arranged on one of the two adhesive faces of the pressure-sensitive adhesive body and acts as a release liner (inter-liner) for preventing the blocking between adjacent pressure-sensitive adhesive layers with each other. The release liner A is generally removed prior to the removal of the release liner B mentioned below. A pressure-sensitive adhesive tape roll according to an embodiment of the present invention is generally prepared by helically winding (bobbin-winding) the double-sided pressure-sensitive adhesive tape around the bobbin so that the release liner A faces outward of the resulting roll (i.e., present on a side opposite to the bobbin).

The release liner A contains at least one resin selected from the group consisting of low-density polyethylenes (LDPEs), linear low-density polyethylenes (LLDPEs), and ethylene-vinyl acetate resins (EVAs) as an essential component. These resins are relatively resistant to slippage, thereby prevent the weaving (dislocation) in a cross direction (width direction) of the pressure-sensitive adhesive tape during winding and inhibit the looseness in winding of the pressure-sensitive adhesive tape roll. A release liner A, if containing only resins having high slippage, such as high-density polyethylenes (HDPEs) and fluorine-containing polymers, may often cause the roll to lose its shape in winding. Of the resins for use herein, preferred are low-density polyethylenes (LDPEs), because they can be peeled off more satisfactorily from the pressure-sensitive adhesive body.

The low-density polyethylenes (LDPEs) are polyethylenes that have long-chain branches and are prepared by polymerization of ethylene monomers through high-pressure process. The density of LDPEs is preferably 0.905 (g/cm$^3$) or more and less than 0.930 (g/cm$^3$), as measured by the method according to Japanese Industrial Standards (JIS) K 7112. The linear low-density polyethylenes (LLDPEs) are linear polyethylenes which are prepared by polymerization of ethylene and an α-olefin monomer having 3 to 8 carbon atoms through low-pressure process. The lengths of their short-chain branches are preferably those corresponding to 1 to 6 carbon atoms. Preferred examples of the α-olefin monomer include 1-butene, 1-hexene, and 1-octene. The density of LLDPEs is preferably from 0.90 to 0.935 (g/cm$^3$), as measured by the method according to JIS K 7112.

Though not critical, the vinyl acetate content in the ethylene-vinyl acetate resin is, for example, from 10 to 30 percent by weight, preferably from 11 to 25 percent by weight, and more preferably from 12 to 20 percent by weight.

The release liner A may have a single-layer structure or multilayer structure including two or more layers. The release liner A, if having a single-layer structure, preferably contains at least one of LDPEs, LLDPEs, and EVAs in a total content of preferably 80 percent by weight or more, and more preferably 90 percent by weight or more, based on the total weight of the release liner A.

The release liner A, if having a multilayer structure, has only to include at least one release layer containing at least one resin selected from the group consisting of LDPEs, LLDPEs, and EVAs as essential component. Exemplary multilayer structures include a structure of (release layer)/(substrate for release liner (liner base)) and a structure of (release layer)/(liner base)/(release layer). At least a side of the release liner A to be in contact with the pressure-sensitive adhesive body should be a release layer. When the release liner A has a multilayer structure, at least one release layer thereof (in particular the release layer to be in contact with the pressure-sensitive adhesive body) preferably contains at least one of LDPEs, LLDPEs, and EVAs in a total content of preferably 80 percent by weight or more, and more preferably 90 percent by weight or more, based on the total weight of the release layer.

Examples of the substrate for release liner (liner base) include, but are not limited to, plastic base films (synthetic resin films) such as polyester films (e.g., poly(ethylene terephthalate) films), olefinic resin films (e.g., polyethylene films and polypropylene films), poly(vinyl chloride) films, polyimide films, polyamide films, and rayon films; paper bases, i.e., bases made of papers such as woodfree papers, Japanese papers, kraft papers, glassine papers, synthetic papers, and topcoat papers; and laminates of them. Among them, olefinic resin films are preferred, of which polyethylene films are more preferred.

The thickness of the release liner A can be chosen in consideration typically of winding workability and operability of the double-sided pressure-sensitive adhesive tape and peeling workability of the release liner A from the pressure-sensitive adhesive tape upon use. The thickness is usually from about 10 to 300 μm, preferably from about 20 to 150 μm, and more preferably from about 30 to 100 μm. When the release liner A includes a liner base and a release layer, the thickness of the liner base is, for example, from 5 to 200 μm, preferably from 10 to 100 μm, and more preferably from 15 to 70 μm; and the thickness of the release layer is, for example, from 5 to 150 μm, preferably from 8 to 80 μm, and furthermore preferably from 10 to 60 μm. The release layer, if having an excessively small thickness, may often cause unevenness of release force. Contrarily, the release layer, if having an excessively large thickness, may cause inferior workability.

The release liner A can be prepared according to a known film forming process and/or film laminating process, such as extrusion, coextrusion, dry lamination, coating, and inflation (blown-film extrusion) processes.

Release Liner B

The release liner B in the double-sided pressure-sensitive adhesive tape is a release liner arranged on the other adhesive face of the pressure-sensitive adhesive body opposite to the release liner A and acts as a release liner (product-liner) for protecting the adhesive face.

The release liner B is a release liner essentially containing an olefinic resin (olefinic release liner). Such olefinic release liner as the release liner B is advantageous when the pressure-sensitive adhesive tape is used typically for the bonding of automotive components, because the olefinic release liner B does not contain silicones and thereby prevents adhesion failure. The olefinic release liner shows an adequate flexibility with respect to the bubble-containing pressure-sensitive adhesive layer and thereby helps to prevent liner pop-off, in contrast to polyester release liners which have relatively high rigidity. In addition, the olefinic release liner has strength higher than release liners containing paper bases and is thereby advantageous from the viewpoint of strength.

The release liner B (olefinic release liner) used herein is not essentially limited, as long as being a release liner using an olefinic film or sheet containing an olefinic resin as an essential component (polyolefinic film or sheet). It may include an olefinic film or sheet alone or may include an olefinic film or sheet and a releasably treated layer on a surface thereof. The olefinic film or sheet may have a single layer structure or multilayer structure.

A release agent (parting agent) for constituting the releasably treated layer is not especially limited and can be known or common release agents. Exemplary release agents usable herein include fluorine-containing release agents, long-chain alkyl release agents, fatty amide release agents, molybdenum sulfide release agents, and silica powders. Each of different release agents can be used alone or in combination.

Examples of the olefinic resins include, but are not limited to, polyethylenes such as low-density polyethylenes, linear low-density polyethylenes, metallocene-catalyzed polyethylenes, medium-density polyethylenes, and high-density polyethylenes; polypropylenes; polybutenes such as poly(1-butene)s; poly(4-methyl-1-pentene)s; α-olefin copolymers such as copolymers of ethylene with an α-olefin having 3 to 10 carbon atoms (hereinafter also referred to as "ethylene-α-olefin copolymers") and copolymers of propylene with an α-olefin having 4 to 10 carbon atoms (hereinafter also referred to as "propylene-α-olefin copolymers"). Exemplary olefinic resins further include copolymers of ethylene with another component than α-olefin. Examples thereof include ethylene-unsaturated carboxylic acid copolymers such as ethylene-acrylic acid copolymers (EAAs) and ethylene-methacrylic acid copolymers (EMAAs); ionomers; ethylene-(meth)acrylate copolymers such as ethylene-methyl acrylate copolymers, ethylene-ethyl acrylate copolymers (EEAs), and ethylene-methyl methacrylate copolymers (EMMAs); ethylene-vinyl acetate copolymers (EVAs); and ethylene-vinyl alcohol copolymers. Each of different olefinic resins can be used alone or in combination.

The α-olefin having 3 to 10 carbon atoms in the ethylene-α-olefin copolymers (copolymers of ethylene with an α-olefin having 3 to 10 carbon atoms) is preferably at least one α-olefin (comonomer) selected from the group consisting of propylene, 1-butene, 1-hexene, 4-methyl-1-pentene, and 1-octene. Accordingly, preferred exemplary ethylene-α-olefin copolymers include ethylene-propylene copolymers and ethylene-(1-butene) copolymers. The α-olefin having 4 to 10 carbon atoms in the propylene-α-olefin copolymers is preferably at least one α-olefin (comonomer) selected from the group consisting of 1-butene, 1-hexene, 4-methyl-1-pentene, and 1-octene. Accordingly, preferred exemplary propylene-α-olefin copolymers include propylene-(1-butene) copolymers.

Of the olefinic resins, preferred are polyethylenes, polypropylenes, and ethylene-α-olefin copolymers, of which polyethylenes are more preferred, and linear low-density polyethylenes, low-density polyethylenes, high-density polyethylenes, and any mixtures of them are especially preferred. The release liner B (olefinic release liner) is therefore preferably any of polyethylene release liners using polyethylene films or sheets, and is more preferably any of polyethylene release liners using linear low-density polyethylene films or sheets, low-density polyethylene films or sheets, high-density polyethylene films or sheets, and films or sheets of arbitrary mixture of them. The release liner B is furthermore preferably one using any of multilayer polyethylene films or sheets containing one or more polyethylene resins selected from the group consisting of linear low-density polyethylenes, low-density polyethylenes, high-density polyethylenes, and arbitrary mixtures of them. Above all, the release liner B is especially preferably one using a multilayer polyethylene film or sheet having a structure of (low-density polyethylene)/(a mixture of low-density polyethylene and high-density polyethylene)/(a mixture of low-density polyethylene and high-density polyethylene).

The high-density polyethylenes (HDPEs) are polyethylenes which have substantially no branches and are prepared by polymerization of ethylene monomer through low pressure process or middle pressure process. The density of HDPEs is preferably from 0.930 to 0.965 (g/cm$^3$).

Though not critical, the thickness of the release liner B is, for example, preferably from 3 to 500 μm, more preferably from 10 to 300 μm, and furthermore preferably from 50 to 200 μm.

These olefinic polymers such as ethylene polymers can be easily prepared according to known procedures, while choosing conditions for polymerization reaction and conditions for subsequent purification and fractionation.

Commercial products can be used as the olefinic resins without further treatment.

Pressure-Sensitive Adhesive Tape Roll

A pressure-sensitive adhesive tape roll according to an embodiment of the present invention (hereinafter also simply referred to as a "roll") is a roll which includes a bobbin (core or spool) and the double-sided pressure-sensitive adhesive tape helically wound around the bobbin. The winding is generally performed so that the release liner B directs inward (i.e., faces the bobbin), and the release liner A directs outward (faces outside of the roll). As used herein the term "helically winding" or "bobbin winding" refers to a winding procedure in which the pressure-sensitive adhesive tape is traversed in a cross direction and is helically wound around the bobbin.

Materials for the bobbin are not especially limited and can be those generally used. Preferred examples of materials for the bobbin include, but are not limited to, plastic resins and papers. Exemplary plastic resins include olefinic resins such as polyethylenes, polypropylenes, ethylene-propylene copolymers, mixtures of polyethylenes with polypropylenes, and ethylene-vinyl acetate copolymers; and poly(vinyl chloride)s. Though not critical in shape, the bobbin is preferably round tubular or cylindrical. The diameter of the cylinder is preferably from 10 to 200 mm, and more preferably from 50 to 150 mm, though not critical.

The pressure-sensitive adhesive tape roll satisfies all the following dimensional conditions (a), (b), and (c) in portions occupying 70% or more (for example, from 70% to 99%) of the total length of the pressure-sensitive adhesive tape constituting the roll. Specifically, (a) a crosswise extending-off portion of the release liner A of an (n)th-turn portion of the pressure-sensitive adhesive tape vertically overlaps the pressure-sensitive adhesive body of an adjacent (n+1)th-turn portion of the pressure-sensitive adhesive tape to form an overlapping portion; (b) the width of the overlapping portion is one half or more of the width of the pressure-sensitive adhesive body; and (c) the pressure-sensitive adhesive body of the (n)th-turn portion of the pressure-sensitive adhesive tape is not present directly below (does not vertically overlap) the pressure-sensitive adhesive body of the adjacent (n+1)th-turn portion of the pressure-sensitive adhesive tape. As used herein "dimensional conditions (a), (b), and (c)" refer to dimensional conditions in a cross section along an axial direction of the bobbin. The dimensional conditions (a), (b), and (c) are preferably satisfied in portions occupying 75% or more, and more preferably 80% or more, of the total length of the pressure-sensitive adhesive tape constituting the roll. This configuration (relation between adjacent turns of the pressure-sensitive adhesive tape) of the roll increases the frictional drag of the pressure-sensitive adhesive tape in a cross direction and thereby prevents the looseness in winding of the roll caused by slippage of the pressure-sensitive adhesive tape in the cross direction.

The way to wind a pressure-sensitive adhesive tape around a bobbin to form a pressure-sensitive adhesive tape roll according to the present invention will be illustrated with reference to the attached drawings according to necessity. FIG. 1 is a schematic diagram of a pressure-sensitive adhesive tape roll according to an embodiment of the present invention. The pressure-sensitive adhesive tape roll 1 is prepared by traversing widthwise and helically winding (bobbin-winding) a double-sided pressure-sensitive adhesive tape 2 around a bobbin 3.

Figure 2:
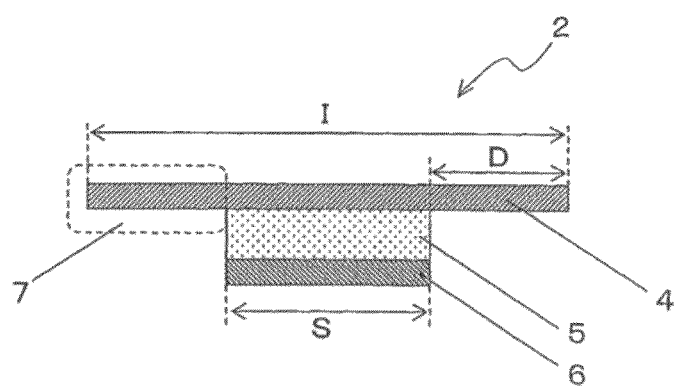
FIG. 2 is a schematic cross-sectional view of an exemplary double-sided pressure-sensitive adhesive tape in the pressure-sensitive adhesive tape roll according to an embodiment of the present invention.

FIG. 2 is a schematic cross-sectional view of an exemplary double-sided pressure-sensitive adhesive tape in the pressure-sensitive adhesive tape roll. The double-sided pressure-sensitive adhesive tape structurally has a pressure-sensitive adhesive body 5, arranged on one adhesive face thereof, a release liner A (inter-liner) 4, and arranged on the other adhesive face, a release liner B (product-liner) 6, as described above.

Though varying according to the intended use of the double-sided pressure-sensitive adhesive tape and being not critical, the width of the pressure-sensitive adhesive body (hereinafter also referred to as "product width (S)") is preferably from 2 to 30 mm, and more preferably 3 to 16 mm. If the product width (S) is less than 2 mm, the resulting product may suffer from insufficient precision of width (i.e., the product width may vary largely). In contrast, if it exceeds 30 mm, it may be difficult to wind the pressure-sensitive adhesive tape through bobbin winding.

Hereinafter the term "product width (S)" is also simply referred to as "S". Likewise, the terms "inter-liner width (I)", "dry width (D)", "product space (SS)", "overlapping width (SI)", and "traverse width (Z)" are also simply referred to as "I", "D", "SS", "SI", and "Z", respectively.

Though not critical, the width of the release liner A (inter-liner) (hereinafter also referred to as "inter-liner width (I)") is from 2×S to 80 mm (25 to 80 mm), and more preferably from 2.6×S to 60 mm (2.65 to 60 mm). If the inter-liner width (I) is less than 2S, the condition: $SI \geq S/2$ may not be satisfied, and if it exceeds 80 mm, the production cost may be increased.

Though not critical, the width of the release liner B is preferably equal to the product width (S) and is therefore preferably from 2 to 30 mm, and more preferably from 3 to 16 mm, because the pressure-sensitive adhesive tape is often prepared through the steps of forming the pressure-sensitive adhesive body on the release liner B and slitting them together.

The width of the release liner A is larger than the width of the pressure-sensitive adhesive body, i.e., the inter-liner width (I) is larger than the product width (S) [I>S]. This specifically prevents adhesion between lateral surfaces (side portions) of adjacent pressure-sensitive adhesive bodies to each other during winding the tape around the bobbin through bobbin winding. As is described above, the inter-liner width is set larger than the product width, and the release liner A thereby extends crosswise off the pressure-sensitive adhesive body of the double-sided pressure-sensitive adhesive tape (crosswise extending-off portion 7 in FIG. 2). Specifically, portions in a width direction of the release liner A each a certain length inside from the both ends thereof are not in contact with the pressure-sensitive adhesive body at the same turn. As used herein the term "crosswise extending-off portion(s) of the release liner A" refers to portion(s) of the release liner A extending off the pressure-sensitive adhesive body, i.e., portion(s) in end regions in a cross direction of the release liner A (portions each a certain length inside from the both ends), which are not in contact with the pressure-sensitive adhesive body. The width of a crosswise extending-off portion of the release liner A (extending off one side of the pressure-sensitive adhesive body) is also referred to as a "dry width (D)". The two extending-off portions extending off both sides of the pressure-sensitive adhesive body may have different dry widths (D), but preferably have identical dry widths (D) [i.e., $D=(I-S)/2$] or substantially identical dry widths (D). Though not critical, the dry widths (D) are each preferably from $0.45(I-S)$ to $0.55(I-S)$, and more preferably from $0.48(I-S)$ to $0.52(I-S)$.

Figure 3:
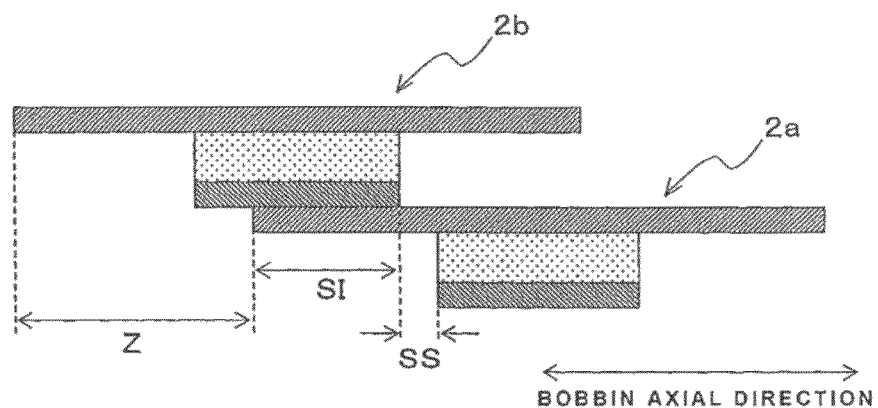
FIG. 3 is a schematic diagram (schematic cross-sectional view) showing how an (n)th-turn portion of the pressure-sensitive adhesive tape is located with respect to an adjacent (n+1)th-turn portion of the pressure-sensitive adhesive tape in a pressure-sensitive adhesive tape roll according to an embodiment of the present invention.
Figure 4:
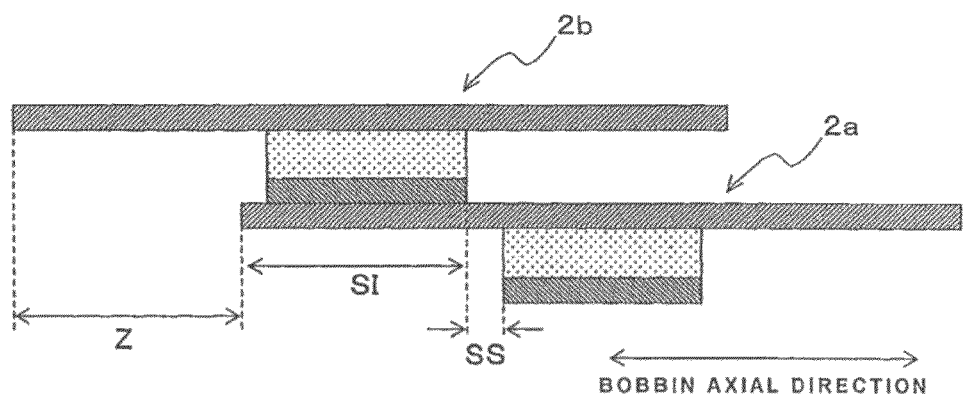
FIG. 4 is a schematic diagram (schematic cross-sectional view) showing how an (n)th-turn portion of the pressure-sensitive adhesive tape is located with respect to an adjacent (n+1)th-turn portion of the pressure-sensitive adhesive tape in a pressure-sensitive adhesive tape roll according to another embodiment of the present invention.
Figure 5:
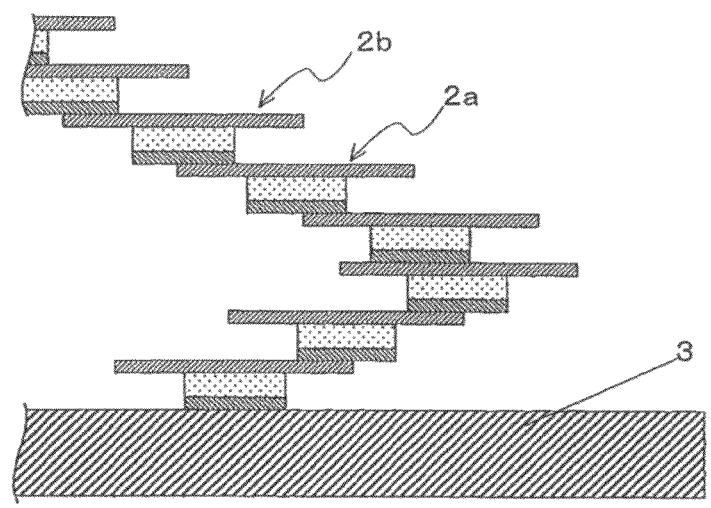
FIG. 5 is a schematic diagram (schematic cross-sectional view) showing how a pressure-sensitive adhesive tape is helically wound (bobbin-wound) around a bobbin to form a pressure-sensitive adhesive tape roll according to an embodiment of the present invention.

FIG. 5 is a schematic diagram (schematic cross-sectional view) showing how a pressure-sensitive adhesive tape is helically wound (bobbin-wound) to form a pressure-sensitive adhesive tape roll according to an embodiment of the present invention. The cross section in FIG. 5 is a cross section including the axis (central axis) of the bobbin. FIGS. 3 and 4 are schematic diagrams (schematic cross-sectional views) each showing how an (n)th-turn portion (2a) of the pressure-sensitive adhesive tape is located with respect to an adjacent (n+1)th-turn portion (2b) of the pressure-sensitive adhesive tape in pressure-sensitive adhesive tape rolls according to embodiments of the present invention. As used herein the term "(n)th turn ((n)th-turn)" means as follows. Typically, when the pressure-sensitive adhesive tape is wound around the bobbin in one turn from the starting position of winding, a portion of the pressure-sensitive adhesive tape from the starting position to just before an adjacent position in a bobbin axial direction (direction perpendicular to the circumferential direction of the roll) to the starting position is referred to as "1st turn (1st-turn)". The number "n" is an arbitrary integer of 1 or more. As used herein the term "adjacent" means being adjacent to each other (being next to each other) in a bobbin axial direction.

In pressure-sensitive adhesive tape rolls according to the present invention, adjacent portions of the pressure-sensitive adhesive tape should satisfy the following conditions (a), (b), and (c) in portions occupying 70% or more of the total length of the pressure-sensitive adhesive tape constituting the roll, where the conditions (a), (b), and (c) are dimensional conditions in a cross section along an axial direction of the bobbin.

Specifically, (c) the pressure-sensitive adhesive body of an (n)th-turn portion of the pressure-sensitive adhesive tape is not present directly below (does not vertically overlap) the pressure-sensitive adhesive body of an adjacent (n+1)th-turn portion of the pressure-sensitive adhesive tape. Specifically, space in the bobbin axial direction is preferably present between the pressure-sensitive adhesive body of an (n)th-turn portion of the pressure-sensitive adhesive tape and the pressure-sensitive adhesive body of an adjacent (n+1)th-turn portion of the pressure-sensitive adhesive tape, as illustrated in FIGS. 3 and 4. If the pressure-sensitive adhesive body of an (n)th-turn portion of the pressure-sensitive adhesive tape vertically overlaps (is present below) the pressure-sensitive adhesive body of an adjacent (n+1)th-turn portion of the pressure-sensitive adhesive tape, the thickness of one pressure-sensitive adhesive body varies because the body is pressed by the adjacent pressure-sensitive adhesive body in a thickness direction. The space (interval) between the pressure-sensitive adhesive body of the (n)th-turn portion of the pressure-sensitive adhesive tape and the pressure-sensitive adhesive body of the (n+1)th-turn portion of the pressure-sensitive adhesive tape is also referred to as "product space (SS)". Though not critical, the product space (SS) is preferably from 0 to 10 mm, and more preferably from 0.5 to 6 mm. If the product space (SS) exceeds 10 mm, the package density of the pressure-sensitive adhesive tape in the roll may be excessively low, and the total length of the wound pressure-sensitive adhesive tape may be excessively short, and these may be disadvantageous in cost and productivity.

Further, (a) at least part of an extending-off portion of the release liner A in a cross direction of an (n)th-turn portion of the pressure-sensitive adhesive tape should lie below (vertically overlap) the pressure-sensitive adhesive body of an adjacent (n+1)th-turn portion of the pressure-sensitive adhesive tape to form an overlapping portion; and (b) the width of the overlapping portion should be one half or more of the width of the pressure-sensitive adhesive body (product width (S)). The width of the overlapping portion is hereinafter also referred to as "overlapping width (SI)". When the crosswise end of the extending-off portion of the release liner A of an (n)th-turn portion of the pressure-sensitive adhesive tape extends off the crosswise opposite side of the pressure-sensitive adhesive body of an adjacent (n+1)th-turn portion of the pressure-sensitive adhesive tape as illustrated in FIG. 4, the "overlapping width (SI)" refers to a length including the extended portion, namely, refers to a length from the innermost position of the overlapping portion between the extending-off portion and the pressure-sensitive adhesive body to the crosswise end of the extending-off portion. In other words, the "overlapping width (SI)" refers to a length in the overlapping portion as determined by subtracting the product space (SS) from the dry width (D) of the (n)th-turn portion of the pressure-sensitive adhesive tape [SI=D−SS], wherein, when the extending-off portions extending off the both sides of the pressure-sensitive adhesive body have different dry widths, "D" in the above equation is the dry width of the extending-off portion nearer to the adjacent (n+1)th-turn portion of the pressure-sensitive adhesive tape. Specifically, the overlapping width (SI) may be larger than the product width (S) (FIG. 4) in some embodiments.

As used herein the term "overlap" means that there is an overlapping portion when viewed from a perpendicular direction to the plane of the pressure-sensitive adhesive tape (normal direction). In the "overlapping", two layers in question may overlap each other directly (be in direct contact) or indirectly with the interposition of one or more other layers.

The overlapping width (SI) should be one half or more of the width of the pressure-sensitive adhesive body (product width (S)) [SI≧S/2], and is preferably from 0.5S to (80−S (mm))/2, and more preferably from 0.8S to (60−S (mm))/2. If the overlapping width (SI) is less than one half of the width (S) of the pressure-sensitive adhesive body, the frictional force in a crosswise direction between adjacent portions of the pressure-sensitive adhesive tape is not sufficiently large, thus often causing looseness in winding and other problems. If the overlapping width (SI) is more than (80−S (mm))/2, this may invite excessively high cost.

The traverse width (Z) is preferably from S to (S+10 (mm)), and more preferably from (S+0.5 (mm)) to (S+6 (mm)). As used herein the term "traverse width (Z)" refers to a distance between a crosswise end of the release liner A of an (n)th-turn portion of the pressure-sensitive adhesive tape and a crosswise end in the same side of the release liner A of an adjacent (n+1)th-turn portion of the pressure-sensitive adhesive tape. Alternatively, the "traverse width (Z)" refers to a distance between the crosswise center of the pressure-sensitive adhesive body of an (n)th-turn portion of the pressure-sensitive adhesive tape and the crosswise center of the pressure-sensitive adhesive body of an adjacent (n+1)th-turn portion of the pressure-sensitive adhesive tape. The product space (SS) is determined by subtracting the product width (S) from the traverse width (Z) [SS=Z−S].

Though not critical, the length (total length) of the double-sided pressure-sensitive adhesive tape in the pressure-sensitive adhesive tape roll is preferably from 200 to 1500 m, and more preferably from 500 to 1000 m. A double-sided pressure-sensitive adhesive tape, if having a length of less than 200 m, is not effective to be helically wound (bobbin-wound) around the bobbin. In contrast, if the double-sided pressure-sensitive adhesive tape has a length of more than 1500 m, the wound roll may have inferior treatability because of its excessively large diameter (winding diameter).

Pressure-sensitive adhesive tape rolls according to embodiments of the present invention are usable typically as pressure-sensitive adhesive tapes for fixing automotive door gaskets and as pressure-sensitive adhesive tapes for fixing automotive side moldings.

EXAMPLES

The present invention will be illustrated in further detail with reference to several examples and comparative examples below. It should be noted, however, these examples are never construed to limit the scope of the present invention.

Example 1

A double-sided pressure-sensitive adhesive tape used herein is a double-sided pressure-sensitive adhesive tape including a release liner A (inter-liner), a release liner B (product-liner), and a pressure-sensitive adhesive body each mentioned below. This pressure-sensitive adhesive tape has the same structure as illustrated in FIG. 2, i.e., the structure of (release liner A)/(pressure-sensitive adhesive body)/(release liner B). The width of the release liner A (inter-liner width (I)), the width of the pressure-sensitive adhesive body (product width (S)), and the dry width (D) of the double-sided pressure-sensitive adhesive tape are shown in Table 1. The extending-off portions extending off both sides of the pressure-sensitive adhesive body have the same dry width (D). The width of the release liner B is equal to the product width (S); and hereinafter the same.

The double-sided pressure-sensitive adhesive tape was traversed and helically wound around a bobbin (core) for a winding length of 700 m, to give a helically wound pressure-sensitive adhesive tape roll. The bobbin (core) herein was made from paper and had a diameter of 155 mm and a length of 600 mm. The winding was performed so that the traverse width (Z) and overlapping width (SI) stand at the values given in Table 1 in portions of about 600 m of the pressure-sensitive Good: The roll does not become loose even being shaken.
Fair: The roll does not become loose when being stood but becomes loose when being shaken
Poor: The roll becomes loose in a cross direction when only being stood.

TABLE 1

| | Product width S (mm) | Inter-liner width I (mm) | Dry width D (mm) | Traverse width Z (mm) | Product space SS (mm) | Overlapping width SI (mm) | One half of product width S/2 (mm) | Resistance to looseness of roll |
|---|---|---|---|---|---|---|---|---|
| Example 1 | 8 | 20 | 6 | 10 | 2 | 4 | 4 | Good |
| Example 2 | 8 | 30 | 11 | 10 | 2 | 9 | 4 | Good |
| Example 3 | 6 | 30 | 12 | 8 | 2 | 10 | 3 | Good |
| Example 4 | 10 | 40 | 15 | 14 | 4 | 11 | 5 | Good |
| Com. Ex. 1 | 10 | 20 | 5 | 14 | 4 | 1 | 5 | Poor |
| Com. Ex. 2 | 8 | 20 | 6 | 14 | 6 | 0 | 4 | Poor | adhesive tape roll. The overlapping width (SI) is the overlapping width between a crosswise extending-off portion of the release liner A of an (n)th-turn portion of the pressure-sensitive adhesive tape and the pressure-sensitive adhesive body of an adjacent (n+1)th-turn portion of the pressure-sensitive adhesive tape.

The dimensional conditions between the (n)th-turn portion of the pressure-sensitive adhesive tape and the adjacent (n+1)th-turn portion of the pressure-sensitive adhesive tape are as shown in Table 1, in portions of about 600 m of the pressure-sensitive adhesive tape roll. The dimensional conditions of samples prepared in the following examples and comparative examples are also shown in Table 1.

Double-Sided Pressure-Sensitive Adhesive Tape

Release Liner A: A single-layer film 60 μm thick prepared through tubular extrusion blowing from a low-density polyethylene (LDPE) having a density of 0.919 (g/cm$^3$);

Release Liner B: A polyethylene release liner 150 μm thick

Pressure-Sensitive Adhesive Body: A substrate-less double-sided pressure-sensitive adhesive body (thickness: 1200 μm) including no substrate but an acrylic pressure-sensitive adhesive layer containing bubbles and hollow microspheres alone In this example, "HYPERJOINT A3012" supplied by Nitto Denko Corporation was used as an assembly (laminate) of the release liner B and pressure-sensitive adhesive body.

Examples 2 to 4 and Comparative Examples 1 and 2

Bobbin-wound pressure-sensitive adhesive tape rolls were prepared by the procedure of Example 1, except for setting dimensional conditions as given in Table 1. Examples of the dimensional conditions include the inter-liner width (I), product width (S), and dry width (D) of the double-sided pressure-sensitive adhesive tape; and the overlapping width (SI) between the crosswise extending-off portion of the release liner A of an (n)th-turn portion of the pressure-sensitive adhesive tape and the pressure-sensitive adhesive body of an adjacent (n+1)th-turn portion of the pressure-sensitive adhesive tape, and the traverse width (Z) in the pressure-sensitive adhesive tape roll.

Evaluation: Resistance to looseness in winding of pressure-sensitive adhesive tape roll Each of the pressure-sensitive adhesive tape rolls prepared in the examples and comparative examples was stood and shaken by hand, and how the pressure-sensitive adhesive tape roll became was evaluated according to the following criteria. The evaluation results are shown in Table 1

Table 1 demonstrates that the pressure-sensitive adhesive tape rolls according to Examples 1 and 4, in which the overlapping width (SI) is one half or more of the product width (S), are resistant to looseness in winding and are superior. In contrast, the pressure-sensitive adhesive tape rolls according to Comparative Examples 1 and 2, in which the overlapping width (SI) is less than one half of the product width (S), readily become loose.

What is claimed is:

1. A pressure-sensitive adhesive tape roll comprising a bobbin and a double-sided pressure-sensitive adhesive tape helically wound around the bobbin, the double-sided pressure-sensitive adhesive tape satisfying all the following conditions (1) to (5):
   (1) the double-sided pressure-sensitive adhesive tape includes a pressure-sensitive adhesive body having two adhesive faces as both sides thereof, a release liner A arranged on one of the two adhesive faces, and a release liner B arranged on the other adhesive face;
   (2) the pressure-sensitive adhesive body includes at least a pressure-sensitive adhesive layer containing bubbles and/or hollow microspheres;
   (3) the release liner A essentially contains at least one resin selected from the group consisting of low-density polyethylenes, linear low-density polyethylenes, and ethylene-vinyl acetate resins;
   (4) the release liner B essentially contains at least one olefinic resin; and
   (5) the release liner A has a width larger than the width of the pressure-sensitive adhesive body, wherein each outer edge of the release liner A extends past each out edge of the pressure pressure-sensitive adhesive body,
   wherein all the following conditions (a), (b), and (c) are satisfied in portions occupying 70% or more of the total length of said tape:
   (a) at least part of the width of the release liner A of an (n)th-turn portion of the tape vertically overlaps the pressure-sensitive adhesive body of an adjacent (n+1) th-turn portion of the tape to form an overlapping portion;
   (b) the width of the overlapping portion is one half or more of the width of the pressure-sensitive adhesive body; and
   (c) the pressure-sensitive adhesive body of the (n)th-turn portion of the tape does not vertically overlap the pressure-sensitive adhesive body of the adjacent (n+1) th-turn portion of the tape.

2. The pressure-sensitive adhesive tape roll according to claim 1, wherein the pressure-sensitive adhesive body has a width of from 2 to 30 mm.

3. The pressure-sensitive adhesive tape roll according to claim 2, wherein the pressure-sensitive adhesive body has a thickness of from 1 µm to 5 mm.

4. The pressure-sensitive adhesive tape roll according to claim 2, wherein the release liner A has a thickness of from 10 to 300 µm.

5. The pressure-sensitive adhesive tape roll according to claim 2, wherein the release liner B has a thickness of from 3 to 500 µm.

6. The pressure-sensitive adhesive tape roll according to claim 2, wherein the total length of the double-sided pressure-sensitive adhesive tape is from 200 to 1500 m.

7. The pressure-sensitive adhesive tape roll according to claim 2, wherein the pressure-sensitive adhesive layer mainly comprises an acrylic pressure-sensitive adhesive.

8. The pressure-sensitive adhesive tape roll according to claim 1, wherein the pressure-sensitive adhesive body has a thickness of from 1 µm to 5 mm.

9. The pressure-sensitive adhesive tape roll according to claim 8, wherein the release liner A has a thickness of from 10 to 300 µm.

10. The pressure-sensitive adhesive tape roll according to claim 8, wherein the release liner B has a thickness of from 3 to 500 µm.

11. The pressure-sensitive adhesive tape roll according to claim 8, wherein the total length of the double-sided pressure-sensitive adhesive tape is from 200 to 1500 m.

12. The pressure-sensitive adhesive tape roll according to claim 8, wherein the pressure-sensitive adhesive layer mainly comprises an acrylic pressure-sensitive adhesive.

13. The pressure-sensitive adhesive tape roll according to claim 1, wherein the release liner A has a thickness of from 10 to 300 µm.

14. The pressure-sensitive adhesive tape roll according to claim 13, wherein the release liner B has a thickness of from 3 to 500 µm.

15. The pressure-sensitive adhesive tape roll according to claim 13, wherein the pressure-sensitive adhesive layer mainly comprises an acrylic pressure-sensitive adhesive.

16. The pressure-sensitive adhesive tape roll according to claim 1, wherein the release liner B has a thickness of from 3 to 500 µm.

17. The pressure-sensitive adhesive tape roll according to claim 16, wherein the pressure-sensitive adhesive layer mainly comprises an acrylic pressure-sensitive adhesive.

18. The pressure-sensitive adhesive tape roll according to claim 1, wherein the total length of the double-sided pressure-sensitive adhesive tape is from 200 to 1500 m.

19. The pressure-sensitive adhesive tape roll according to claim 18, wherein the pressure-sensitive adhesive layer mainly comprises an acrylic pressure-sensitive adhesive.

20. The pressure-sensitive adhesive tape roll according to claim 1, wherein the pressure-sensitive adhesive layer mainly comprises an acrylic pressure-sensitive adhesive.

\* \* \* \* \*